(12) United States Patent
Kim et al.

(10) Patent No.: US 8,310,746 B2
(45) Date of Patent: Nov. 13, 2012

(54) METHOD AND AN APPARATUS FOR DISPLAYING THREE-DIMENSIONAL IMAGE USING A HOLOGRAM OPTICAL ELEMENT

(75) Inventors: Sunil Kim, Seoul (KR); Yoonsun Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 12/364,037

(22) Filed: Feb. 2, 2009

(65) Prior Publication Data

US 2009/0323145 A1    Dec. 31, 2009

(30) Foreign Application Priority Data

Jun. 26, 2008    (KR) .................. 10-2008-0061111

(51) Int. Cl.
*G03H 1/22*    (2006.01)

(52) U.S. Cl. ................................ 359/32; 345/6
(58) Field of Classification Search .......... None
See application file for complete search history.

(56) References Cited

U.S. PATENT DOCUMENTS

| | | | | |
|---|---|---|---|---|
| 6,175,431 B1 * | 1/2001 | Waldern et al. | ................. | 359/15 |
| 6,198,554 B1 * | 3/2001 | Kanda et al. | .................... | 359/28 |
| 7,092,003 B1 | 8/2006 | Siegel et al. | | |

FOREIGN PATENT DOCUMENTS

| | | | |
|---|---|---|---|
| JP | 06-067591 A | | 3/1994 |
| JP | 2001-022255 A | | 1/2001 |
| JP | 2003-057595 A | | 2/2003 |
| KR | 1996-0016600 | | 5/1996 |
| KR | 19960016600 A | * | 5/1996 |
| KR | 1020020064462 A | | 8/2002 |

* cited by examiner

*Primary Examiner* — Derek S Chapel
(74) *Attorney, Agent, or Firm* — Sughrue Mion, PLLC

(57) ABSTRACT

The image display device including a lighting unit having a plurality of light source units, a hologram optical unit, which reproduces light to form a plurality of screen images spatially apart from each other when light is incident from the lighting unit, and a display panel, which modulates light reproduced by the hologram optical unit according to image signals.

16 Claims, 7 Drawing Sheets

METHOD AND AN APPARATUS FOR DISPLAYING THREE-DIMENSIONAL IMAGE USING A HOLOGRAM OPTICAL ELEMENT

CROSS-REFERENCE TO RELATED PATENT APPLICATION

This application claims the benefit of Korean Patent Application No. 10-2008-0061111, filed on Jun. 26, 2008, in the Korean Intellectual Property Office, the disclosure of which is incorporated herein in its entirety by reference.

BACKGROUND

1. Field

Embodiments of the present invention relate to a three-dimensional (3D) image display device, and more particularly, to a 3D image display device embodying 3D images by forming a plurality of images with different depths by using a hologram element.

2. Description of the Related Art

Three-dimensional (3D) image display devices can present images with more reality and efficiency, and thus are demanded in fields such as medical imaging, video games, advertisement, education, the military, etc. Thus, methods of embodying 3D images such as holography or stereoscopy are being developed widely.

The holography method involves recording interference signals obtained by overlapping light from the subject of an image and reference light with coherency and reproducing the recorded interference signals, and is an ultimate method for displaying 3D images. However, the method requires a massive capacity of data, and peripheral technologies such as signal processing are not secured yet.

The stereoscopy method involves separately showing two-dimensional (2D) images with a binocular parallax to the left eye and the right eye of a viewer such that the images are shown as 3D images. For example, a stereoscopic 3D image display device employs a liquid crystal display (LCD) panel, in which the left-eye pixels for displaying image information for the left eye and the right-eye pixels for displaying image information for the right eye are alternately formed, and a parallax barrier for separating images for the left eye and images for the right eye such that the images are respectively shown to the left eye and the right eye. According to the stereoscopy method, a 3D image display device can be configured with a flat-panel display panel and simple optical elements, and thus, using a slim 3D image display device can embody 3D images. However, since images for the left eye and images for the right eye are required to be displayed on a single panel, the resolution of images is reduced to 50% or less and eye fatigue may occur easily. Furthermore, it is not easy to embody 2D images together with 3D images owing to the structure such that left eye images and right eye images are displayed on a single panel.

There is a method of presenting actual depth by using a plurality of display panels. However, using a plurality of display planes not only increases the size of a 3D image display system, but also increases the manufacturing cost of the system.

SUMMARY

The embodiments of the present invention may provide a method and an apparatus for 3D image display, embodying 3D images by forming a plurality of images with different depths by using a hologram element.

According to an aspect of the present invention, there is provided a 3D (three-dimensional) image display device including a lighting unit comprising a plurality of light source units, a hologram optical unit, which reproduces light to form a plurality of screen images spatially apart from each other when light is incident from the lighting unit, and a display panel, which modulates light reproduced by the hologram optical unit according to image signals.

The plurality of light source units are sequentially turned on and off. The display panel forms a 3D image by sequentially modulating a plurality of subframe images formed by dividing a frame of an image into a number of images, wherein the number of subframe images is the same as the number of light source units.

The plurality of subframe images may include a background image and a foreground image.

The hologram optical unit may include a plurality of hologram elements to which the plurality of screen images are respectively recorded. The hologram optical unit may include a hologram element to which the plurality of screen images are multiply recorded by using a plurality of reference light paths, each of which has an orientation different from each other.

According to another aspect of the present invention, there is provided a method of displaying 3D (three-dimensional) images, the method including reproducing light from hologram optical unit, the lights forming a plurality of screen images at a plurality of locations spatially apart from each other, and dividing a frame of an image into a plurality of subframe images and modulating the reproduced lights according to image signals which correspond to the subframe images.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1:
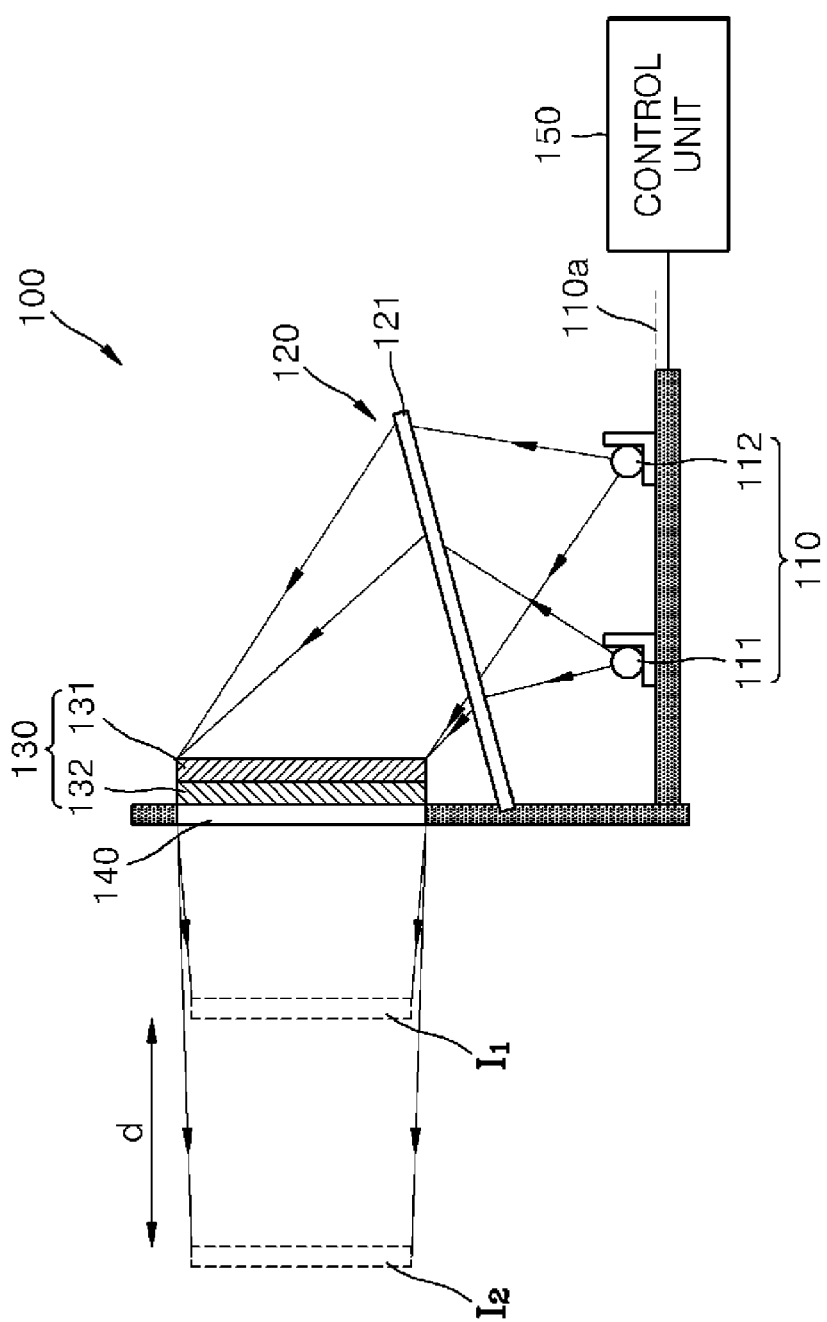
FIG. 1 is a sectional view showing the structure of a 3D image display device, according to an embodiment of the present invention.

A method and an apparatus for displaying three-dimensional (3D) image according to embodiments of the present invention will now be described more fully with reference to the accompanying drawings, in which exemplary embodiments of the invention are shown. Like reference numerals in the drawings denote like elements. In the drawings, the thicknesses of layers and regions may be exaggerated for clarity.

FIG. 1 is a sectional view showing the structure of a 3D image display device 100, according to an embodiment of the present invention. FIGS. 2A, 2B, 3A, and 3B are diagrams for describing how hologram optical unit employed in the 3D image display device 100 of FIG. 1 form a plurality of screen images, which are spatially apart from each other, according to embodiments of the present invention. Furthermore, FIG. 4 is a graph illustrating diffraction efficiency of the hologram element in general.

A method of displaying 3D images, according to an embodiment of the present invention, includes sequentially reproducing light forming a plurality of screen images on a plurality of locations spatially apart from each other, dividing a frame of an image into a plurality of subframe images, and modulating the sequentially reproduced light according to corresponding image signals. The 3D image display device 100 shown in FIG. 1 is a device displaying 3D images according to the method. Referring to FIG. 1, the 3D image display device 100 includes a lighting unit 110, a hologram optical unit 130, and a display panel 140. Between the lighting unit 110 and the hologram optical unit 130, a optical path changing unit 120 may further be disposed. Furthermore, the 3D image display device 100 further includes a control unit 150 controlling driving of the lighting unit 110 and the display panel 140.

The lighting unit 110 includes a first light source unit 111 and a second light source unit 112. In the present embodiment, the lighting unit 110 includes two light source units; however, the present invention is not limited thereto and the lighting unit 110 can include a plurality of light source units. The number of light source units forming the lighting unit 110 is the same as that of the plurality of screen images formed by the hologram optical unit 130. Light sources of the first and second light source units 111 and 112 may be light emitting diodes (LED), laser diodes, or general projector lamps. The first light source unit 111 and the second light source unit 112 are turned on and off by the control unit 150, and are alternately turned on and off in synchronization with time multiplexing driving of the display panel 140, as described below.

The hologram optical unit 130 is disposed to form the plurality of screen images that are spatially apart from each other. Thus, the hologram optical unit 130 includes the first hologram element 131 and the second hologram element 132; however, the present invention is not limited thereto and thus, the hologram optical unit 130 can include a plurality of hologram elements, in which the plurality of screen images are respectively recorded, to reproduce light forming the plurality of screen images.

It is described below how the first hologram element 131 and the second hologram element 132 form the plurality of screen images that are spatially apart from each other.

Figure 2A:
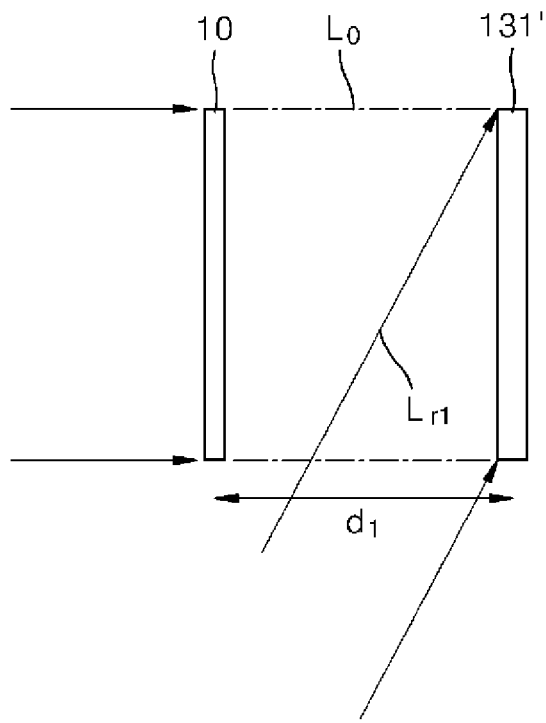
FIGS. 2A, 2B, 3A, and 3B are diagrams describing how the hologram optical unit employed in the 3D image display device of FIG. 1 form a plurality of screen images, which are spatially apart from each other, according to embodiments of the present invention.
Figure 2B:
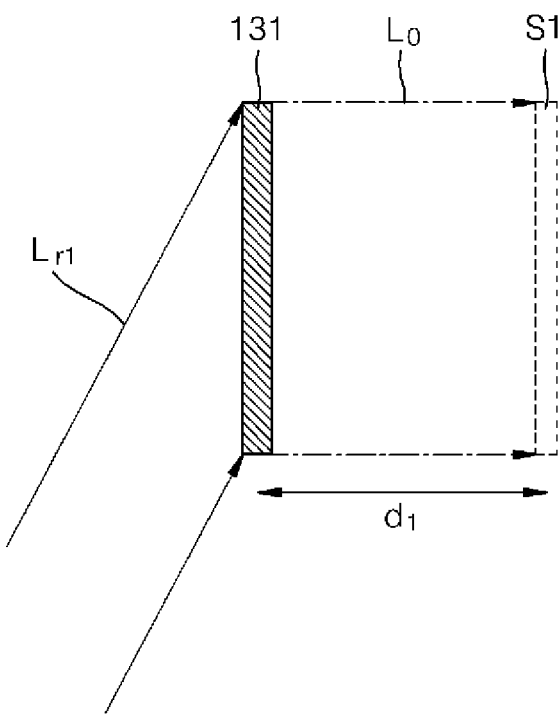

FIGS. 2A and 2B show process that the first hologram element 131 is manufactured by recording a hologram corresponding to a screen image to a hologram medium 131' and the screen image is reproduced from the first hologram element 131. The hologram corresponding to a screen image can be formed by recording an image regarding a diffuser 10 to the hologram medium 131', for example. The hologram medium 131' is formed of a photosensitive material such as a photoresist, a photopolymer, etc., and can store image information as optical interference pattern formed by interference between object light which contains image data and reference light $Lr_1$ which does not contain image data. In other words, when light is irradiated onto the diffuser 10, object light Lo containing image data of the diffuser 10 is emitted from the diffuser 10, and the interference pattern which is formed by interference between this object light Lo and reference Light $Lr_1$ containing no image data is recorded to the hologram medium 131'. Here, a laser beam with excellent coherency is used as light forming the reference light $Lr_1$. In FIG. 2B, the first hologram element 131 is the hologram medium 131' on which an image hologram of the diffuser 10 apart from the hologram medium 131' by a distance d1 is recorded. When reference light $Lr_1$, identical to that used in the recording operation, is irradiated onto the first hologram element 131, the reference light $Lr_1$ diffracts due to the hologram formed on the first hologram element 131, and the diffraction restores the object light Lo. The restored object light Lo shows a hologram image of a diffuser, which is equal to that a screen S1, is spatially formed apart from the first hologram element 131 by a distance d1.

Figure 3A:
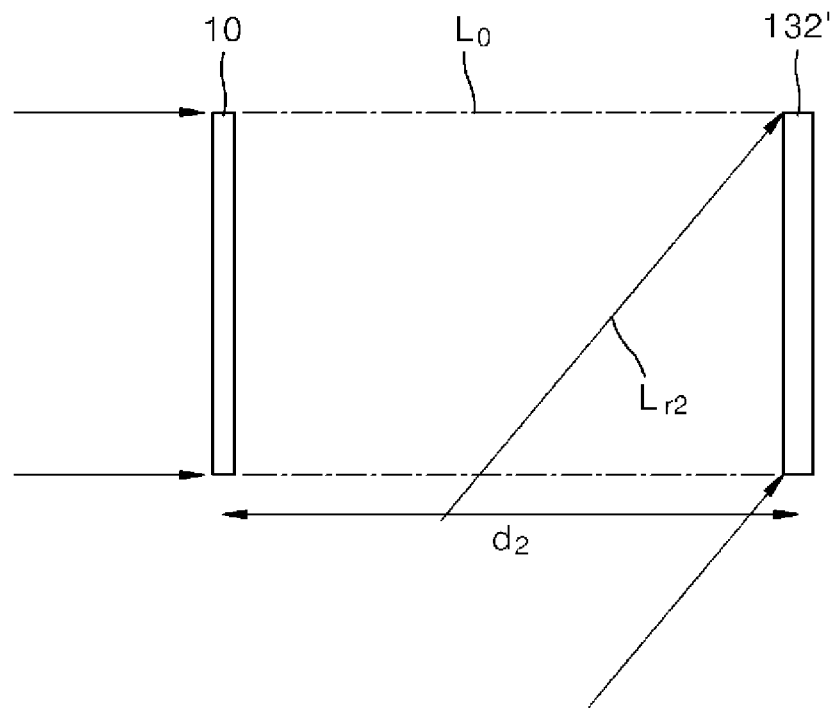
Figure 3B:
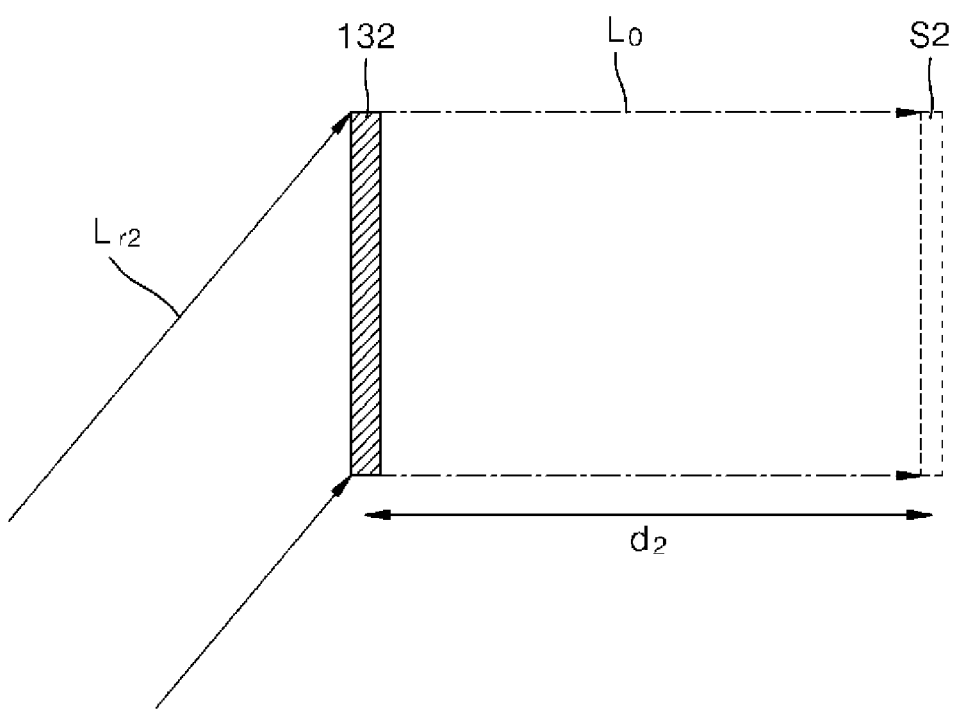
Figure 4:
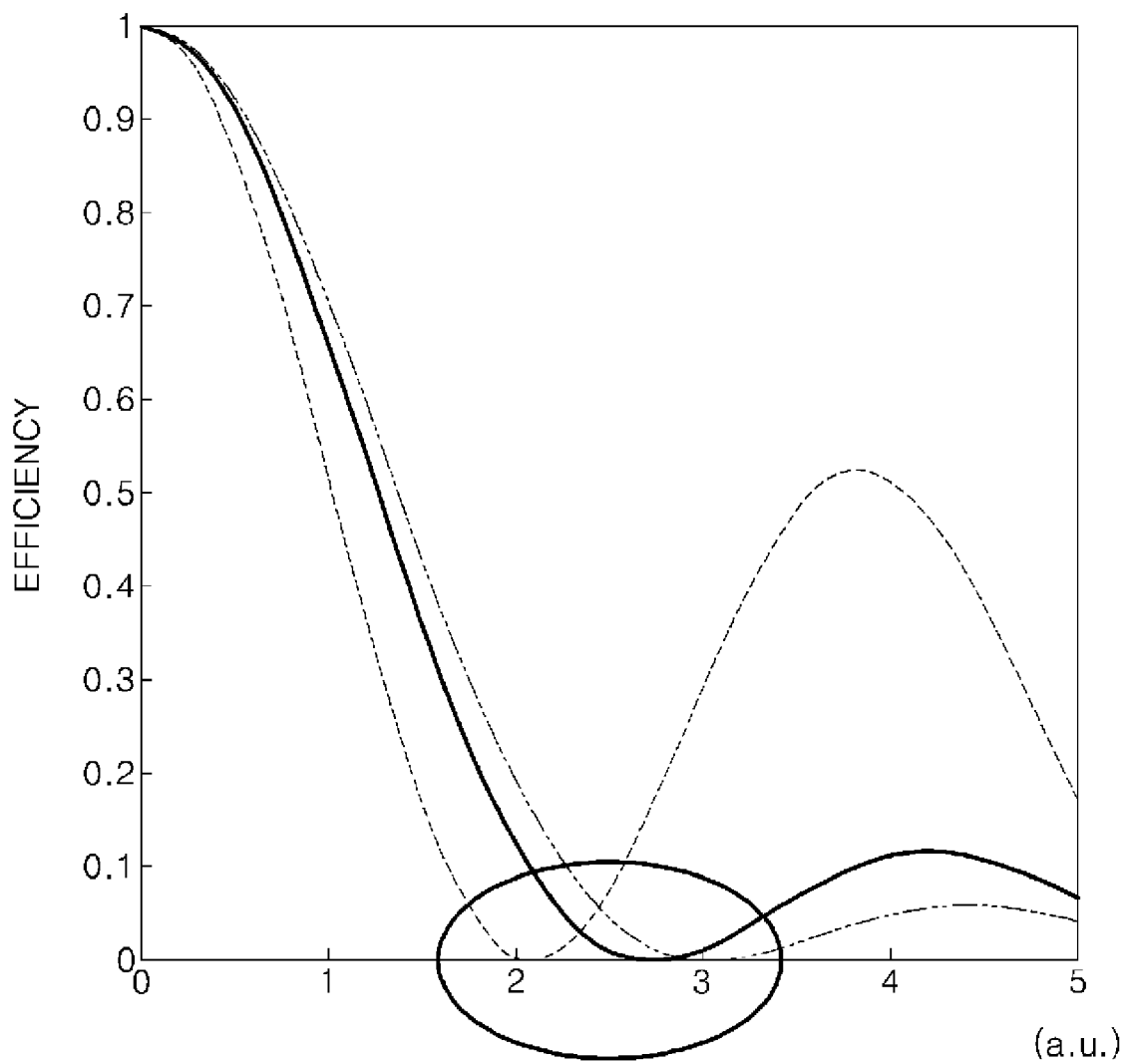
FIG. 4 is a graph illustrating diffraction efficiency of the hologram element in general.

FIGS. 3A and 3B show process that the second hologram 132 is manufactured by recording a hologram corresponding to a screen image to a hologram medium 132' and the screen image is reproduced from the second hologram 132. In this case, the diffuser 10 is located apart from the hologram medium 132' by a distance d2, and then object light Lo containing image data of the diffuser 10 and reference light $Lr_2$ containing no image data are irradiated onto the hologram medium 132'. At this point, an angle in which the reference light $Lr_2$ is incident to the hologram medium 132' is different from that of the reference light $Lr_1$ in FIGS. 2A and 2B. An interference pattern, which is formed as the object light Lo and the reference Light $Lr_2$ interfere with each other, is recorded to the hologram medium 132'. In FIG. 3A, the second hologram element 132 is the hologram medium 132' on which an image hologram of the diffuser 10 apart from the hologram medium 132' by a distance d2 is recorded. When reference light $Lr_2$, identical to that used in the recording operation, is irradiated onto the second hologram element 132, the object light Lo is restored, and a screen S2 is spatially formed apart from the first hologram element 132 by a distance d2.

The 3D image display device 100 according to the current embodiment employs the first and second hologram elements 131 and 132, which are manufactured as described above, and uses the characteristic that a hologram can only be reproduced in an angle of reference light used during recording. In other words, a hologram exhibits the maximum efficiency when reproduced in an angle that is the same as an angle of reference light used during recording, and referred to as the Bragg angle. Outside the Bragg angle, diffraction efficiency decreases significantly. In the graph of FIG. 4 showing diffraction efficiency of a hologram element in general, the horizontal axis represents the Bragg angle, and the vertical axis represents diffraction efficiency of the hologram element. Referring to the graph, it is shown that there is a case in which the diffraction efficiency is zero outside the Bragg angle. Adopting such a principle to the 3D image display device 100, images recorded in the first and second hologram elements 131 and 132 can be reproduced without interference between each other by adjusting an angle of irradiating light to be identical to the Bragg angles of each of the first and second hologram elements 131 and 132.

The first and second light source units 111 and 112 sequentially irradiate lights such that the lights are respectively incident to the first and second hologram elements 131 and 132 at angles corresponding to the Bragg angles of each of the first and second hologram elements 131 and 132. Thus, images each of which are formed in different locations, are sequentially reproduced from the first and second hologram elements 131 and 132.

A holographic polymer dispersed liquid crystal (HPDLC) may be used as hologram medium forming the first and second hologram elements 131 and 132 forming the hologram optical unit 130. A PDLC is a material formed by dispersing polymer inside a liquid crystal cell, and can be electrically controlled to be in either a transparent status or a diffusing status. Specifically, it is known in the art that hologram images can be electrically switched when the hologram is recorded to the HPDLC, which is formed by dispersing photopolymer inside a liquid crystal cell.

The display panel 140 forms images by modulating the lights reproduced in the hologram optical unit 130 according to image signals, and may be a liquid crystal display (LCD). Since the second and first hologram elements 132 and 131 are disposed behind the display panel 140 on the optical path, the display panel 140 modulates lights reproduced from the first and second hologram elements 131 and 132 according to image signals. The display panel 140 divides a frame of an image into a plurality of images and alternately displays in a time multiplexing method. For example, a frame of an image is divided into two subframe images, and the display panel 140 modulates light according to image signals corresponding to each of the subframe images. The two subframe images may be a background image I1 and a foreground image I2. An interval at which the display panel 140 displays the background image I1 and the foreground image I2 alternately is required to be shorter than an interval at which a viewer V blinks his or her eyes so that the background image I1 and the foreground image I2 are shown as a frame of an image; i.e. approximately shorter than $1/120$ second. The background image I1 forms a depth d, which is equal to the difference between d2 and d1, with respect to the foreground image I2 to the viewer V, as shown in FIG. 1, and thus 3D images can be recognized by the viewer V.

The optical path changing unit 120 is disposed between the lighting unit 110 and the hologram optical unit 130 such that lights from the first and second light source units 111 and 112 are incident to the hologram optical unit 130 at angles different from each other. For example, the optical path changing unit 120 redirects the light paths such that lights from the first and second light source units 111 and 112 are incident at angles of incidence of reference light used during recording of a hologram. Thus, the light path redirection unit 120 may be formed of a fresnel lens 121 obliquely arranged with respect to an imaginary straight line 110a connecting the first and second light source units 111 and 112. The fresnel lens 121 concentrates and collimates lights. Furthermore, as shown in FIG. 1, since the fresnel lens 121 is obliquely arranged with respect to the imaginary straight line 110a, lights from the first and second light source units 111 and 112 are incident to the fresnel lens 121 at angles different from each other. Accordingly, lights from the first and second light source units 111 and 112 travel along paths via which the lights are incident to the hologram optical unit 130 at angles different from each other after the lights pass through the fresnel lens 121. The angle at which the fresnel lens 121 is inclined with respect to the imaginary straight line 110a may be appropriately set in consideration of angles of incidence of reference light used during recording of a hologram to the first and second hologram elements 131 and 132. In the present embodiment, the optical path changing unit 120 is formed of one fresnel lens 121; however, the present invention is not limited thereto, and thus, the optical path changing unit 120 can include a plurality of light path redirection units, which are disposed on light paths of the first and second light source units 111 and 112. Furthermore, the optical path changing unit 120 can include a plurality of light concentrating lenses.

The control unit 150 controls driving of the lighting unit 110 and the display panel 140. For example, the control unit 150 controls the first and second light source units 111 and 112 to turn on and off in synchronization with a sequential modulation of image signals corresponding to two subframe images in the display panel 140. Furthermore, in case where the first and second hologram elements 131 and 132 are formed of HPDLCs as described above, the control unit 150 controls the first and second hologram elements 131 and 132 to switch in synchronized with lighting signals and image signals.

As described above, the viewer V recognizes 3D images from two images with depth d between each other due to formation of a plurality of screen images in the hologram optical unit 130 and synchronized driving of the displayed panel 140 and the lighting unit 110. Furthermore, a general two-dimensional (2D) image can be displayed by using only one of the first and second light source units 111 and 112 forming the lighting unit 110 and modulating light according to 2D image signals in the display panel 140.

Figure 5:
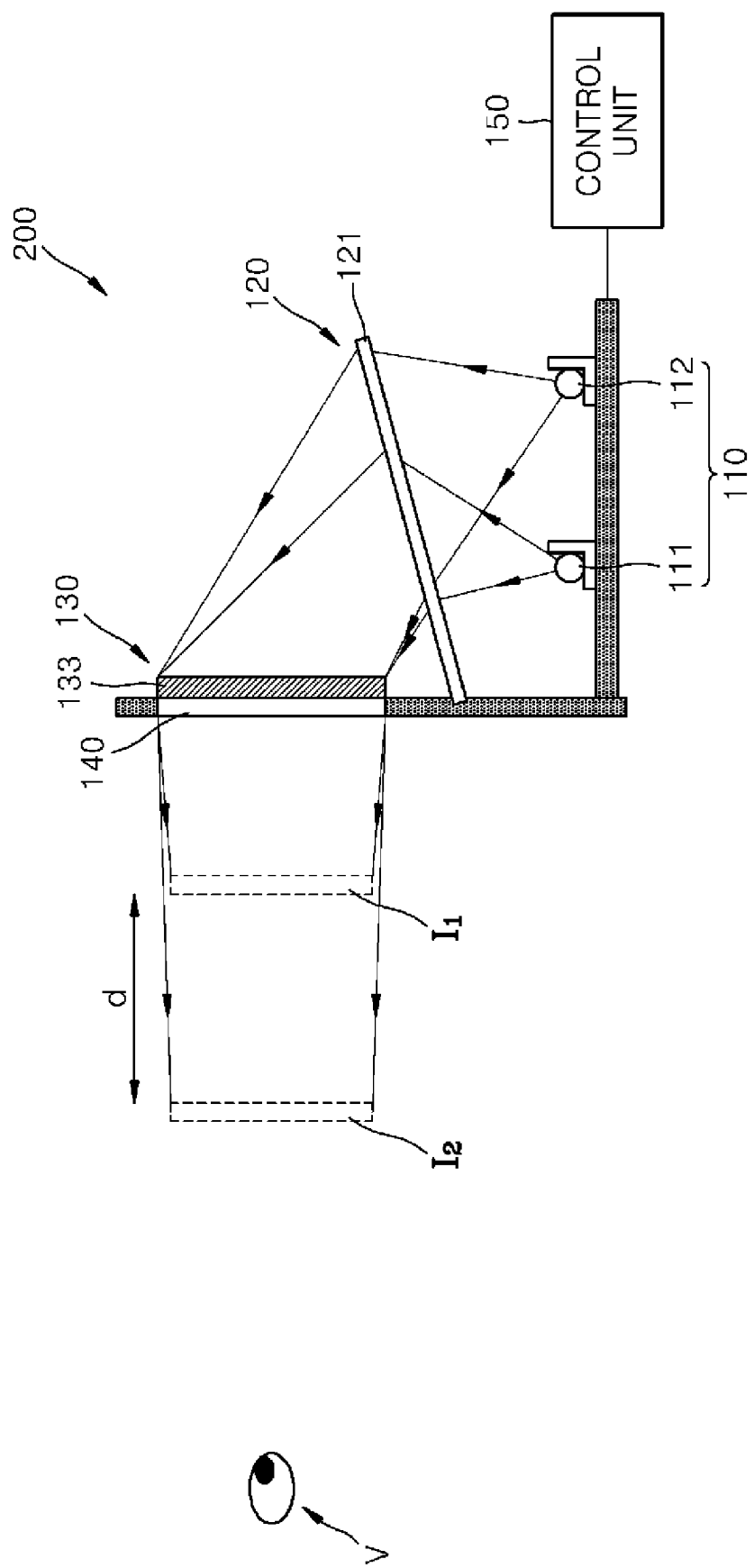
FIG. 5 is a sectional view showing the structure of a 3D image display device, according to another embodiment of the present invention.

FIG. 5 is a sectional view showing the structure of a 3D image display device 200, according to another embodiment of the present invention. FIGS. 6A through 6D are diagrams for describing how hologram optical unit employed in the 3D image display device 200 of FIG. 5 form a plurality of screen images which are spatially apart from each other. The current embodiment is mostly identical to the embodiment of FIG. 1, except for a configuration of the hologram optical unit 130. Thus, only the configuration of the hologram optical unit 130 will be described below. The hologram optical unit 130 is disposed to form a plurality of screen images spatially apart from each other, and includes a third hologram element 133. In other words, the third hologram element 133 is formed by recording hologram images regarding a diffuser at different locations overlapped on a single hologram medium.

Figure 6A:
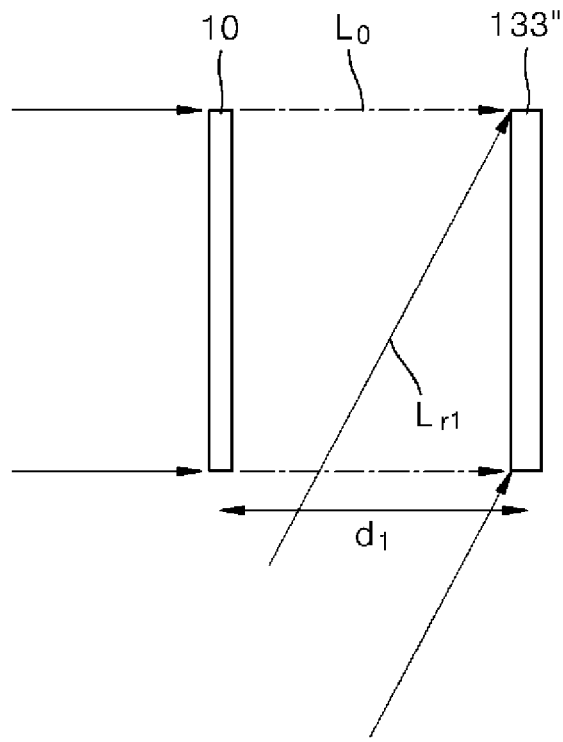
FIGS. 6A through 6D are diagrams for describing how the hologram optical unit employed in the 3D image display device of FIG. 5 form a plurality of screen images, which are spatially apart from each other.
Figure 6B:
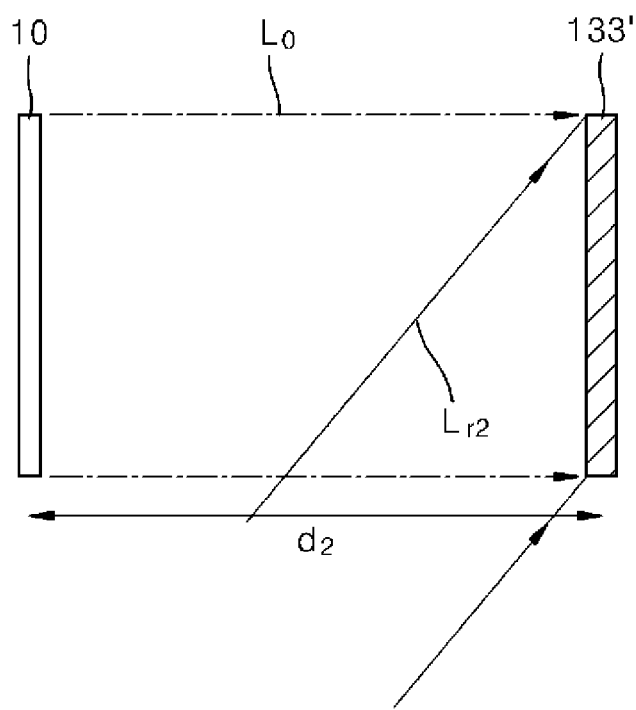
Figure 6C:
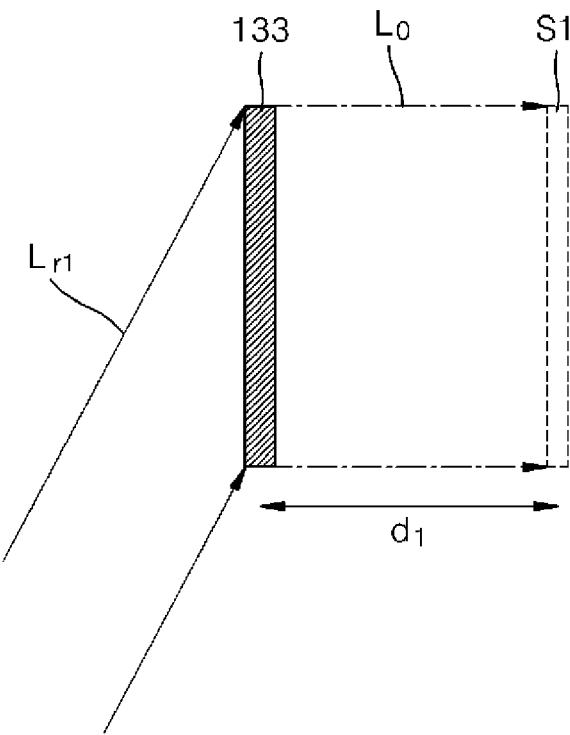
Figure 6D:
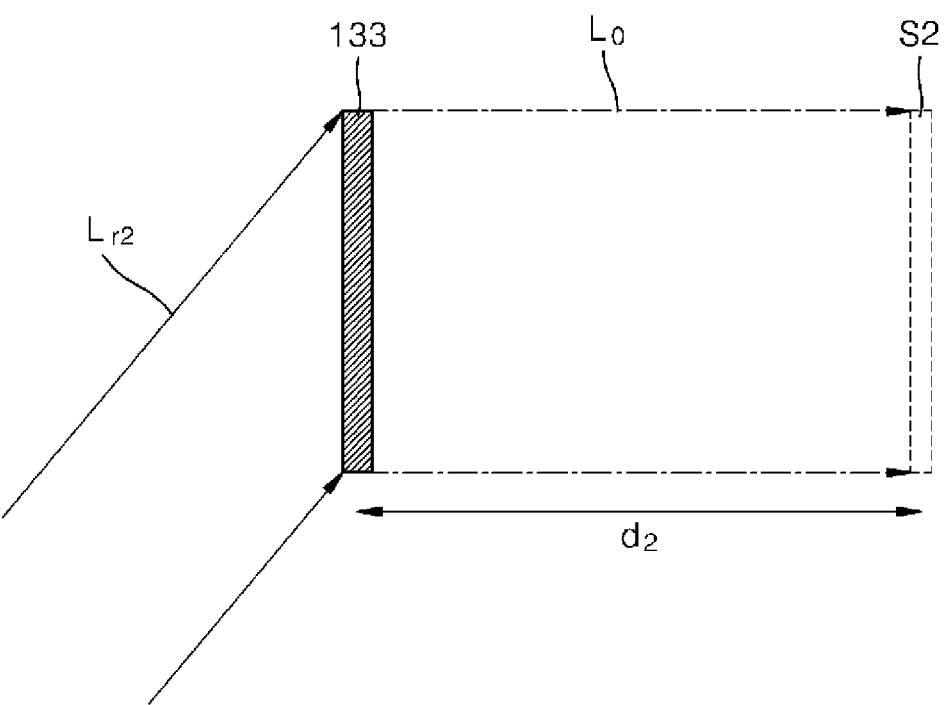

As shown in FIG. 6A, a interference pattern is formed as the object light Lo from the diffuser 10, which is apart from a hologram medium 133" by a distance d1, and reference light $Lr_1$ interfere with each other. The hologram medium 133" is a photosensitive medium, and may be formed of materials such as photoresist, photopolymer, etc. In FIG. 6B, the hologram medium 133' is the hologram medium 133" on which an image hologram of the diffuser 10 apart from the hologram medium 133" by a distance d1 is recorded. Then, the image hologram of the diffuser 10, which is apart from the hologram medium 133" by a distance d2, is also recorded to a hologram medium 133'. For the multiple recording, reference light $Lr_2$ is irradiated at an angle different from an angle at which the reference light $Lr_1$ of FIG. 6A is irradiated. Accordingly, a hologram image of the diffuser 10, which is apart from the hologram medium 133' by a distance d2, is recorded to the hologram medium 133' due to the interference of the object light Lo and the reference light $Lr_2$. In FIG. 6C, the third hologram element 133 is the hologram medium 133" on which image holograms of the diffuser 10, when the diffuser 10 is apart from the hologram medium 133" by distances d1 and d2, are recorded. When reference light $Lr_1$ is irradiated onto the third hologram element 133, a hologram image of the diffuser 10 is reproduced such that a screen S1 is formed at a position apart from the third hologram element 133 by a distance d1. Furthermore, as shown in FIG. 6D, when reference light $Lr_2$ is irradiated onto the third hologram element 133, a screen S2 is formed at a position apart from the third hologram element 133 by a distance d2.

A viewer V recognizes 3D images from two images with depth d between each other due to formation of a plurality of screen images in the hologram optical unit 130 and synchronized driving of the displayed panel 140 and the lighting unit 110. Furthermore, a general 2D image can displayed by using only one of the first and second light source units 111 and 112 forming the lighting unit 110 and modulating light according to 2D image signals in the display panel 140.

Although a case in which the hologram optical unit 130 forms two screen images spatially apart from each other is described in the embodiments above, the present invention is not limited thereto. It is also possible to configure the hologram optical unit 130 to form more than two screen images. In this case, the driving speed of the display panel 140 needs to be increased. Furthermore, although a case in which image holograms of a diffuser at different locations are recorded by changing angles of incidence of reference lights is shown in the embodiments above, the present invention is not limited thereto, and it is also possible to change other optical characteristics of the reference lights, such as phase, wavelength, polarization, etc.

The method and the apparatus for displaying 3D images according to the embodiments of the present invention can reduce fatigue to the eyes of a viewer, which has been a problem in conventional methods of displaying stereoscopic 3D images, and are also advantageous for displaying 2D/3D images. Furthermore, if a display panel has a sufficiently fast driving speed, more realistic 3D images can be displayed by using three or more hologram elements.

While the method and the apparatus for displaying 3D images according to the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A 3D (three-dimensional) image display device comprising:
   a lighting unit comprising a plurality of light source units;
   a hologram optical unit, which reproduces light to form a plurality of screen images spatially apart from each other along a depth direction when light is incident from the lighting unit; and
   a display panel, which modulates the light reproduced by the hologram optical unit according to image signals.

2. The 3D image display device of claim 1, wherein the plurality of light source units are sequentially turned on and off,
   wherein the display panel sequentially modulates a plurality of subframe images formed by dividing a frame of an image into a number of images, and
   wherein the number of subframe images is the same as the number of light source units.

3. The 3D image display device of claim 2, wherein the plurality of subframe images comprise a background image and a foreground image.

4. The 3D image display device of claim 3, wherein the hologram optical unit comprises a plurality of hologram elements to which the plurality of screen images are respectively recorded.

5. The 3D image display device of claim 4, wherein the plurality of screen images respectively recorded to the plurality of hologram elements are recorded by using a plurality of reference light paths, wherein each of reference light paths has an orientation which is different from the other reference light paths.

6. The 3D image display device of claim 4, wherein the plurality of hologram elements are formed of at least one of photoresist and photopolymer.

7. The 3D image display device of claim 4, wherein the plurality of hologram elements are formed of HPDLC (holographic polymer dispersed liquid crystals), which are electrically controlled to be turned on and off.

8. The 3D image display device of claim 7, wherein the plurality of hologram elements are controlled to be sequentially turned on and off in synchronization with driving of the plurality of light source units.

9. The 3D image display device of claim 3, wherein the hologram optical unit comprises a hologram element to which the plurality of screen images are multiply recorded by using a plurality of reference light paths, wherein each of the reference light paths has an orientation which is different from the other reference light paths.

10. The 3D image display device of claim 1, wherein a optical path changing unit is disposed between the lighting unit and the hologram optical unit such that light from each of the plurality of light source units is incident on the hologram optical unit at angles different from each other.

11. The 3D image display device of claim 10, wherein the optical path changing unit is a fresnel lens obliquely arranged with respect to an imaginary straight line connecting the plurality of light source units.

12. The 3D image display device of claim 1, wherein only one of the plurality of light source units is driven to display 2D (two-dimensional) images.

13. A method of displaying 3D (three-dimensional) images, the method comprising:
   reproducing light from a hologram optical unit, the light forming a plurality of screen images at a plurality of locations spatially apart from each other along a depth direction; and
   dividing a frame of an image into a plurality of subframe images and modulating the reproduced light according to image signals, which correspond to the subframe images.

14. The method of claim 13, wherein image holograms formed with a diffuser at different locations are recorded to a plurality of hologram media to form the hologram optical unit.

15. The method of claim 13, wherein image holograms formed with a diffuser at different locations are multiply-recorded to a single hologram medium to form the hologram optical unit.

16. The method of claims 13, wherein the plurality of subframe images comprise a background image and a foreground image.

* * * * *